(12) United States Patent
Alexia et al.

(10) Patent No.: US 6,943,824 B2
(45) Date of Patent: Sep. 13, 2005

(54) IMAGE PROCESSING SPOUT CONTROL SYSTEM

(75) Inventors: Barry Michael Alexia, Ann Arbor, MI (US); Andrew Jackson Brislen, Laguna Niguel, CA (US); John Roderic Wicking, Nelly Bay Queensland (AU); Walter James Frandsen, Jr., San Diego, CA (US)

(73) Assignees: Deere & Company, Moline, IL (US); Albuquerque Real Time, Systems, Inc., Albuquerque, NM (US)

( * ) Notice: Subject to any disclaimer, the term of this patent is extended or adjusted under 35 U.S.C. 154(b) by 574 days.

(21) Appl. No.: 10/096,769

(22) Filed: Mar. 13, 2002

(65) Prior Publication Data

US 2003/0174207 A1 Sep. 18, 2003

(51) Int. Cl.[7] .................................................. H04N 7/18
(52) U.S. Cl. ......................... 348/89; 348/91; 348/120; 348/148
(58) Field of Search ..................... 348/89–94, 143–160, 348/113–120

(56) References Cited

U.S. PATENT DOCUMENTS

| | | | | |
|---|---|---|---|---|
| 4,042,132 A | * | 8/1977 | Bohman et al. ............. 414/335 |
| 4,365,268 A | | 12/1982 | Allen et al. ................... 358/93 |
| 4,376,609 A | | 3/1983 | Bohman et al. ............. 414/335 |
| 4,401,403 A | | 8/1983 | Johnson et al. .............. 414/335 |
| 4,441,846 A | | 4/1984 | Johnson ....................... 414/335 |
| 4,529,348 A | | 7/1985 | Johnson et al. .............. 414/335 |
| 5,140,802 A | * | 8/1992 | Inman et al. ................... 53/459 |
| 5,558,282 A | * | 9/1996 | Ameye et al. ................ 241/60 |
| 5,575,316 A | * | 11/1996 | Pollklas ....................... 141/198 |
| 5,740,746 A | * | 4/1998 | Ledermann et al. ........ 111/174 |
| 5,749,783 A | * | 5/1998 | Pollklas ....................... 460/119 |
| 5,911,669 A | * | 6/1999 | Stentz et al. ............... 56/10.2 F |
| 6,014,903 A | * | 1/2000 | Strubbe et al. ............ 73/861.73 |
| 6,097,425 A | * | 8/2000 | Behnke et al. ................. 348/89 |
| 6,192,664 B1 | * | 2/2001 | Missotten et al. ........ 56/10.2 R |
| 6,208,259 B1 | * | 3/2001 | Lemke ....................... 340/665 |
| 6,247,510 B1 | * | 6/2001 | Diekhans et al. ........... 141/231 |
| 6,587,772 B2 | * | 7/2003 | Behnke ....................... 701/50 |
| 6,682,416 B2 | * | 1/2004 | Behnke et al. .............. 460/114 |
| 6,726,559 B2 | * | 4/2004 | Bischoff ........................ 460/1 |
| 2003/0063968 A1 | * | 4/2003 | Zaun et al. ................. 414/546 |

FOREIGN PATENT DOCUMENTS

| | | |
|---|---|---|
| DE | 44 26 059 A1 | 2/1996 |
| EP | 1 219 158 A1 | 7/2002 |

OTHER PUBLICATIONS

John Deere Operator's Manual; 5730 and 5830 Self-Propelled Forage Harvester; 6 pages; 1988.
John Deere FMO Fundamentals of Machine Operation "Hay and Forage Harvesting"; 5 pages; 1976.
Patent Abstracts of Japan; Publication No. 02242602; Publication Date Sep. 1990.

* cited by examiner

*Primary Examiner*—Andy Rao (57) ABSTRACT

A spout control system controls and aims a spout and a spout cap of a crop harvesting vehicle with respect to a separate crop hauling vehicle moving with the harvesting vehicle. The control system includes a video camera which is mounted on the cap and which views a field of view which includes a portion of the hauling vehicle. An image signal generated by the camera is received by an image processing unit. The image processing unit processes a digitized form of the image signal and automatically generates spout and cap control signals as a function thereof. Actuators automatically aim the spout and the cap in response to the control signal.

31 Claims, 10 Drawing Sheets

Typical jog table format, note variable number of elements in each mode.

|  | TIME | DISPL. |
|---|---|---|
| x slow | 300 | 0 |
|  | 350 | 25 |
|  | 400 | 62 |
|  | 450 | 80 |
|  | 500 | 111 |
| x fast | 400 | 100 |
|  | 500 | 133 |
|  | 600 | 175 |
|  | 700 | 250 |
|  | 800 | 300 |
|  | 900 | 351 |
|  | 1000 | 400 |
| y | 25 | 22 |
|  | 50 | 44 |
|  | 75 | 70 |
|  | 100 | 100 |
|  | 125 | 144 |
|  | 150 | 180 |
|  | 175 | 200 |
|  | 200 | 250 |

IMAGE PROCESSING SPOUT CONTROL SYSTEM

BACKGROUND OF THE INVENTION

The invention relates to a spout control system for controlling and aiming the crop discharge spout and cap of a material collecting vehicle with respect to a separate material hauling vehicle moving with the collecting vehicle.

It is difficult for the operator/driver of a material collecting vehicle, such as a forage harvester crop harvesting vehicle, to control the positioning of the crop discharge spout to achieve desired and/or even filling of a separate material hauling vehicle or crop hauling vehicle which moves along with the collecting or harvesting vehicle. This is because the operator must view spout and the hauling vehicle, thus diverting the operator's attention from other tasks which require the operator's attention.

A system for monitoring loading of products from the spout of a harvester to a separate material hauling vehicle is described in German patent No. DE 44 26 059, published Jan. 2, 1996. This system includes a camera mounted on the spout and a video monitor in the cab of the harvester which displays an image to the harvester operator. However, this system does not process any image signals and generate an automatic spout control signal as a function of a processed image. This system also requires that the harvester operator frequently view the monitor and manually adjust the aim of the spout.

Another system for monitoring loading of products from the spout of a working machine, such as a harvester or combine, to a separate material hauling vehicle is described in U.S. Pat. No. 6,097,425, issued Aug. 1, 2000. This system also includes a video camera mounted on the spout and a video display in the combine which displays an image to the combine operator. However, this system also does not process any image signals and does not generate automatic spout control signals as a function of a processed image, and this system also requires that the harvester operator frequently view the video display and manually adjust the aim of the spout.

U.S. Pat. No. 5,575,316, issued in 1996, describes a system for controlling the sweeping of a spout and the pivoting of discharge pipe on the end of the spout as a function of a distance signal generated by a range finder to achieve even filling of hauling vehicle moving along with a combine. This system does not use video cameras or image processing.

U.S. Pat. No. 5,749,783, issued in 1998, describes a system for automatically filling a hauling vehicle moving along with a harvesting vehicle as a function of signals generated by a pair of distance sensors. This system also does not use video cameras or image processing.

Spout control systems for self-propelled forage harvesters pulling drawbar-attached material receiving wagons are described in U.S. Pat. No. 4,401,403 issued in 1983, U.S. Pat. No. 4,441,846 issued in 1984 and U.S. Pat. No. 4,529,348 issued in 1985, all assigned to Deere & Company. However, these systems all require an angle sensor to sense an angular position of the wagon relative to the pulling vehicle, and therefore are not suited for use when the hauling vehicle is separate from and not towed by the harvesting vehicle. These systems also does not use video cameras or image processing.

SUMMARY OF THE INVENTION

Accordingly, an object of this invention is to provide a system for automatically controlling the spout and cap of a harvesting vehicle with respect to a separate crop receiving vehicle as a function of processed images.

A further object of the invention is to provide such a system which permits, but does not require an operator to view a display.

These and other objects are achieved by the present invention, wherein a spout control system controls and aims a spout and cap of a crop harvesting vehicle with respect to a separate crop hauling vehicle moving with the harvesting vehicle. The control system includes at least one video camera which is mounted on or near the end of a pivotal cap on an end of the spout and which views a field of view which includes a portion of the hauling vehicle. An image signal generated by the camera is received by an image processing unit. The image processing unit processes a digital form of the image signal and automatically generates spout and cap control signals as a function thereof. Spout and cap actuators automatically move the spout and the cap in response to the control signal.

DETAILED DESCRIPTION

Figure 1:
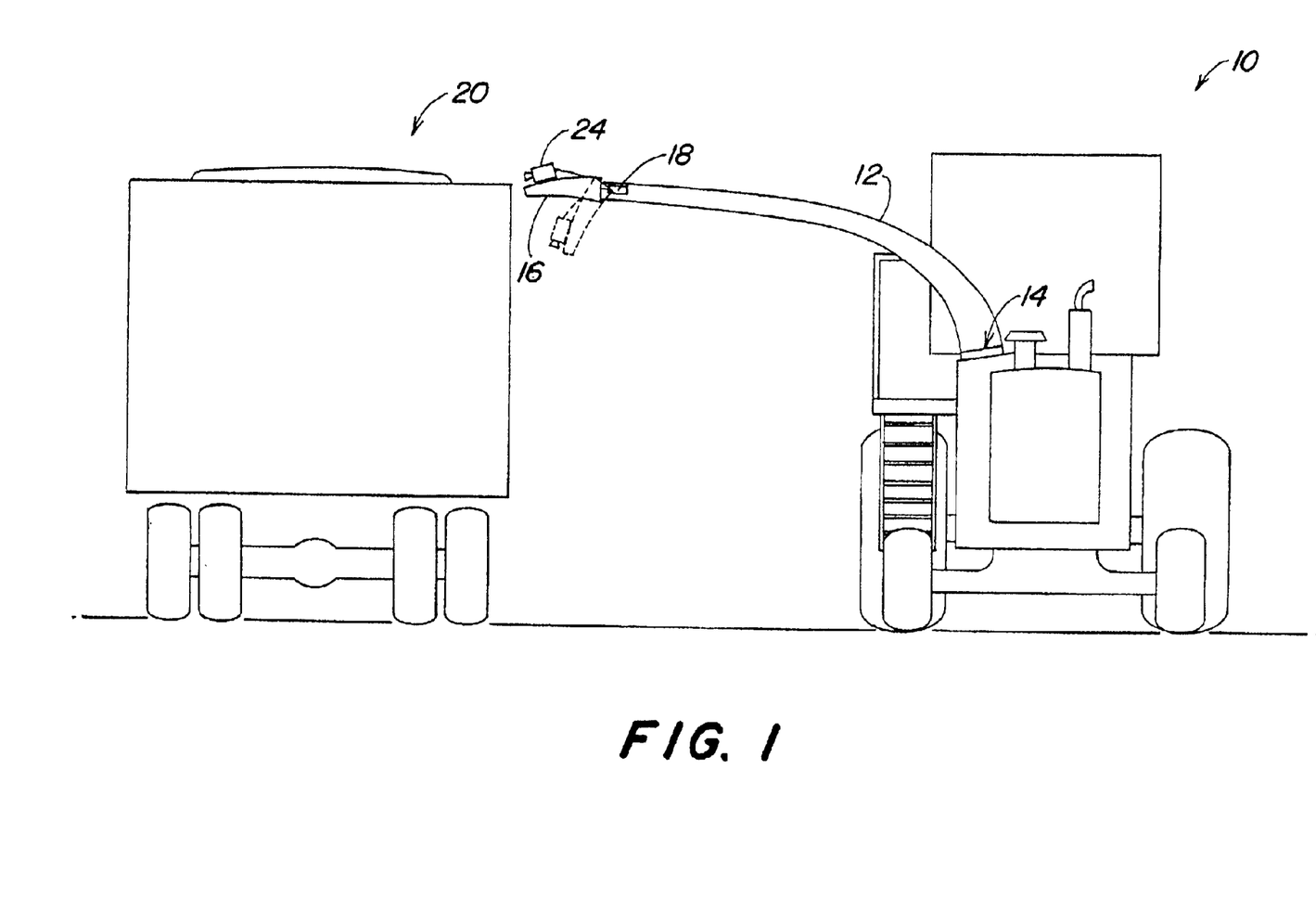
FIG. 1 is a schematic view of a crop gathering vehicle with a pivoting crop discharge spout and cap delivering crop to a crop receiving and hauling vehicle.

Referring to FIG. 1, a material collecting vehicle or crop gathering vehicle 10, such as a commercially available John Deere 50 Series self-propelled forage harvester, includes a pivotal crop discharge spout 12 which is pivoted by a conventional bi-directional electrohydraulic spout rotating motor 14. The spout 12 has a conventional cap 16 pivoted by a conventional cap motor 18.

Figure 2:
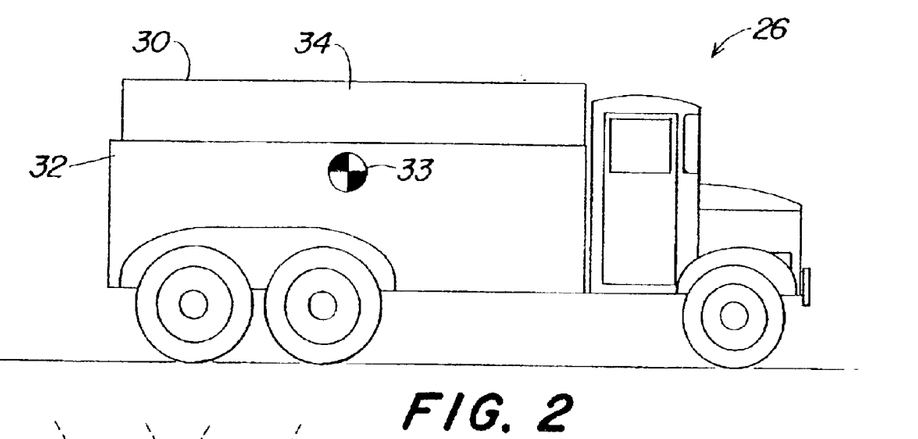
FIG. 2 is a simplified side view of a crop receiving and hauling vehicle.
Figure 3:
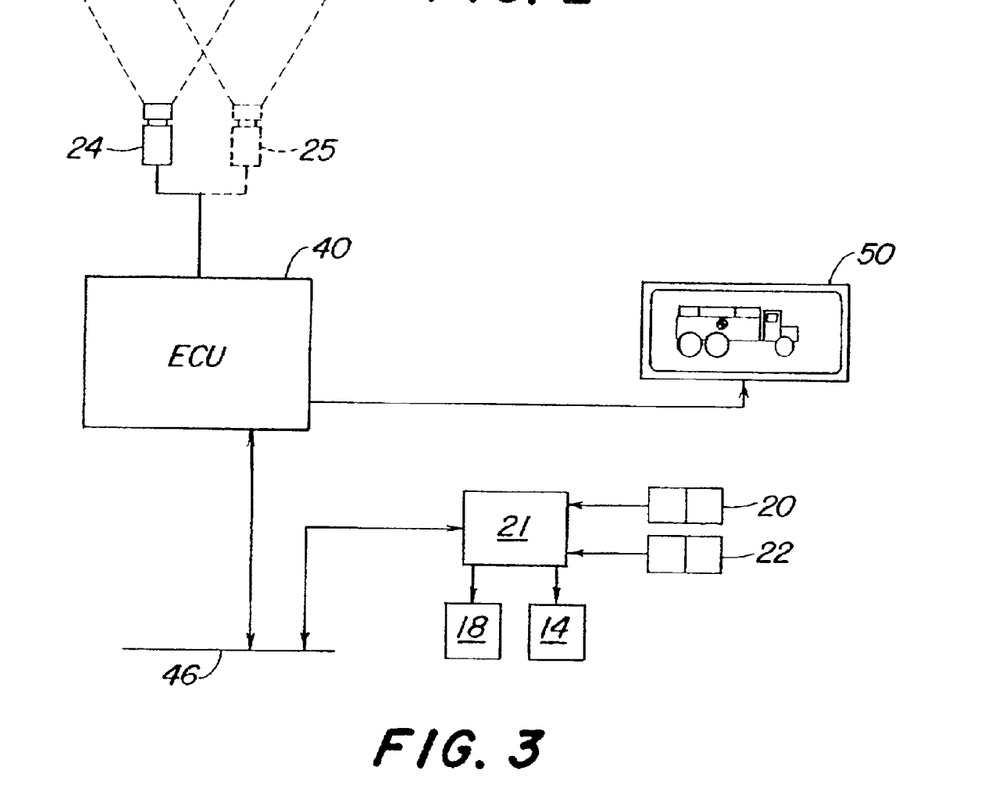
FIG. 3 is a simplified schematic diagram of the control system of the present invention.

According to the present invention, a video camera 24 is mounted on or attached to the cap 16 at the end of the spout 12, so as to obtain an image of the field of view in the direction in which material is discharged from the spout 12 and of the crop receiving or hauling vehicle 26, which is shown from the side in FIG. 2. Optionally, as shown in FIG. 3, a second video camera 25 may also be mounted on the cap 16. Two cameras may be used to obtain a useable image in case the crop stream would occlude the view of a single camera. In this case, one camera would be mounted on each side of the crop stream. The images from the two cameras can be electronically "stitched" together, or used alternatively. The spout 12 discharges material to a material hauling vehicle 26, such as a crop hauling vehicle 26. The camera 24 preferably moves with the cap 16 and is aimed by it.

As best seen in FIG. 2, the hauling vehicle 26 may have a cover 30 covering a crop carrying container 32. The cover 30 preferably has a side opening 34 which receives crop from the spout 12 as the vehicles 10 and 26 move over terrain.

The system automatically selects a trackable feature within the field of view of the camera or cameras 24, 25 by any of several known techniques. The trackable feature may be a wear pattern, a portion of lettering, a structural element, or other feature. The trackable feature can also be a target 33 placed on a relatively featureless surface of the vehicle 26 in a location so that the target 33 is viewable by the camera 24. Additional targets (not shown) could be placed on various locations on the hauling vehicle 26. The camera image is analyzed to identify and track the trackable feature.

Referring now to FIG. 3, the control system includes an electronic signal processing and control unit 40 which controls the timing of image taking and the shutter speeds of the camera 24 and which processes image signals from the camera 24 and in response generates a spout command or control signal which is communicated to electronic control module 21 via bus 46. Aiming and pivoting of the spout 12 and the cap 16 may be manually controlled by conventional operator control switches 20 and 22, respectively, which may be mounted on a joystick (not shown) in a cab (not shown) of the harvester 10 or on a control panel (not shown). Switches 20 and 22 are connected to the electronic control module 21 which is also connected to the bus 46. The control module 21 receives the automatic control signals from ECU 40 (via bus 46) and receives the manual control signals from switches 20 and 22. Control module 21 then supplies spout and cap control signals to the spout motor 14 and cap motor 18 via the bus 46. Preferably, control module 21 overrides the automatic control signals from the ECU 40 whenever the switches 20, 22 are manually operated. Alternatively, the functions of the ECU 40 and the control module 21 could be integrated into a single control unit. Preferably, the video data is compressed and then decompressed as it is transmitted from one component to another to allow more rapid transmission, analysis and display.

Optionally, the camera images may be displayed on a monitor 50 mounted in the cab (not shown) of the vehicle 10. The signal delivered to the in-cab monitor 50 may be in either analog or digital format. The monitor 50 may be provided as a convenience for the harvest machine operator in initially positioning the discharge spout, but is not necessary for the automatic image capture, analysis, tracking and spout control functions. Because the monitor 50 can be any of a variety of commercially available displays, this feature can be implemented on existing machines with a variety of different display monitors of different types and sizes, and it possible to transmit the captured video image in either digital or analog format as necessary. In either format, the display of the image from camera 24 can be made to occupy either all, or only some part of the display portion of monitor 50 using known techniques.

The video camera 24 may be a commercially available analog or digital video camera. If a digital camera is used, then the control unit 40 need not digitize the images from the camera. If the captured image is analog, the image information will first be converted by the unit 40 to digital format by standard analog to digital image conversion means. The result is a digital map or image representing the field of view of the camera 24. Preferably, data is transmitted between components in a PCI bus format in order to avoid the limitations of other formats.

If an additional camera 25 is used, the images from both cameras 24 and 25 can be electronically combined, by, for example, "stitching" the images together using known image processing techniques, so that the control unit 40 provides a single, integrated image covering the overlapping field of view of the cameras 24 and 25, thereby providing a greater image coverage that is possible with the single camera 24. In this case, the camera control unit 40 also perform a camera selection function. By electronically combining the images from both cameras 24 and 25, it is possible to minimize or eliminate a blind spot created by the presence of the stream of crop material within a single camera's field of view during harvesting. Electronically combining images also enhances the capacity of the system to track the stream of crop material in real time to provide for exact placement of crop material regardless of wind drift or changes in trajectory caused by varying crop densities or field conditions. Image combining may be accomplished by known techniques such as digitally stitching images together.

In operation, the hauling vehicle 26 and the harvester 10 are initially positioned relative to each other so that the vehicle 26 can receive crop from the harvester 10, and the ECU 40 executes an algorithm or routine as shown in FIGS. 4–8.

Figure 4A:
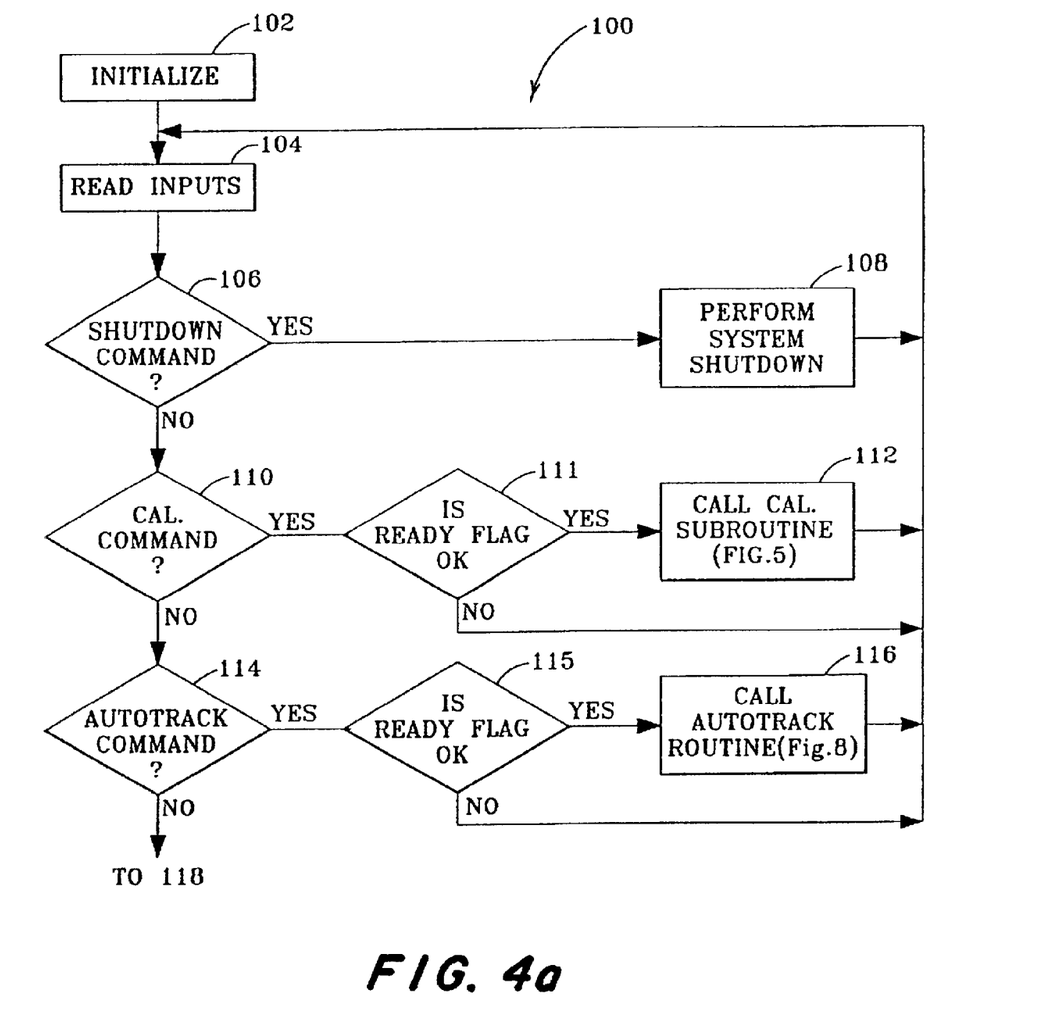
FIGS. 4A and 4B form a logic flow diagram illustrating a basic or executive routine performed by the control unit of FIG. 3.
Figure 4B:
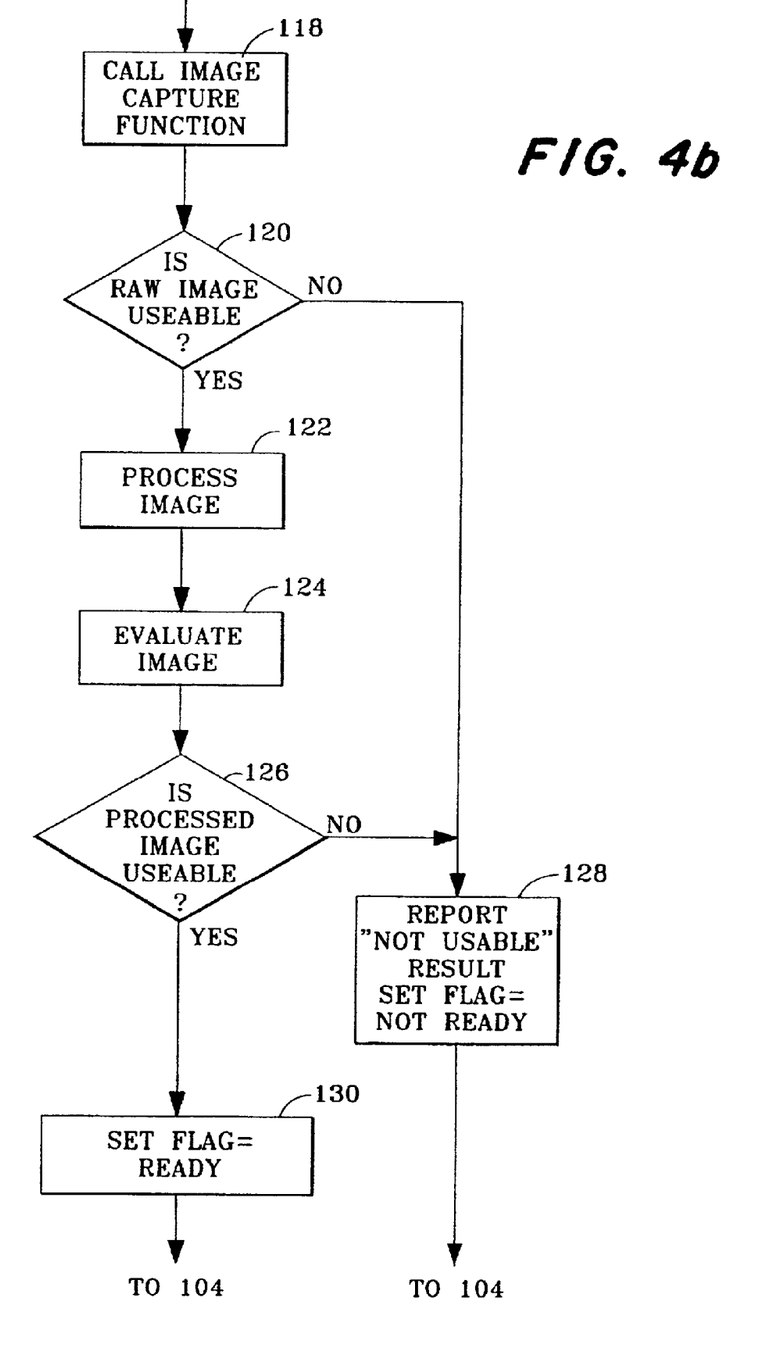

FIGS. 4A and 4B show a simplified overview of the basic or executive signal processing and control algorithm 100 executed by the ECU 40. Step 102 executes an initialization routine wherein a stored initialization file is retrieved or created based on operator inputs and system devices are initialized. Step 104 reads the inputs to the control system. Step 106, in response to a shutdown command, directs the algorithm to step 108 which performs a system shutdown. Step 110, in response to a calibration command, directs the algorithm to step 111, which, if a flag is set to ready, directs the algorithm to step 112, else to step 104.

Figure 5:
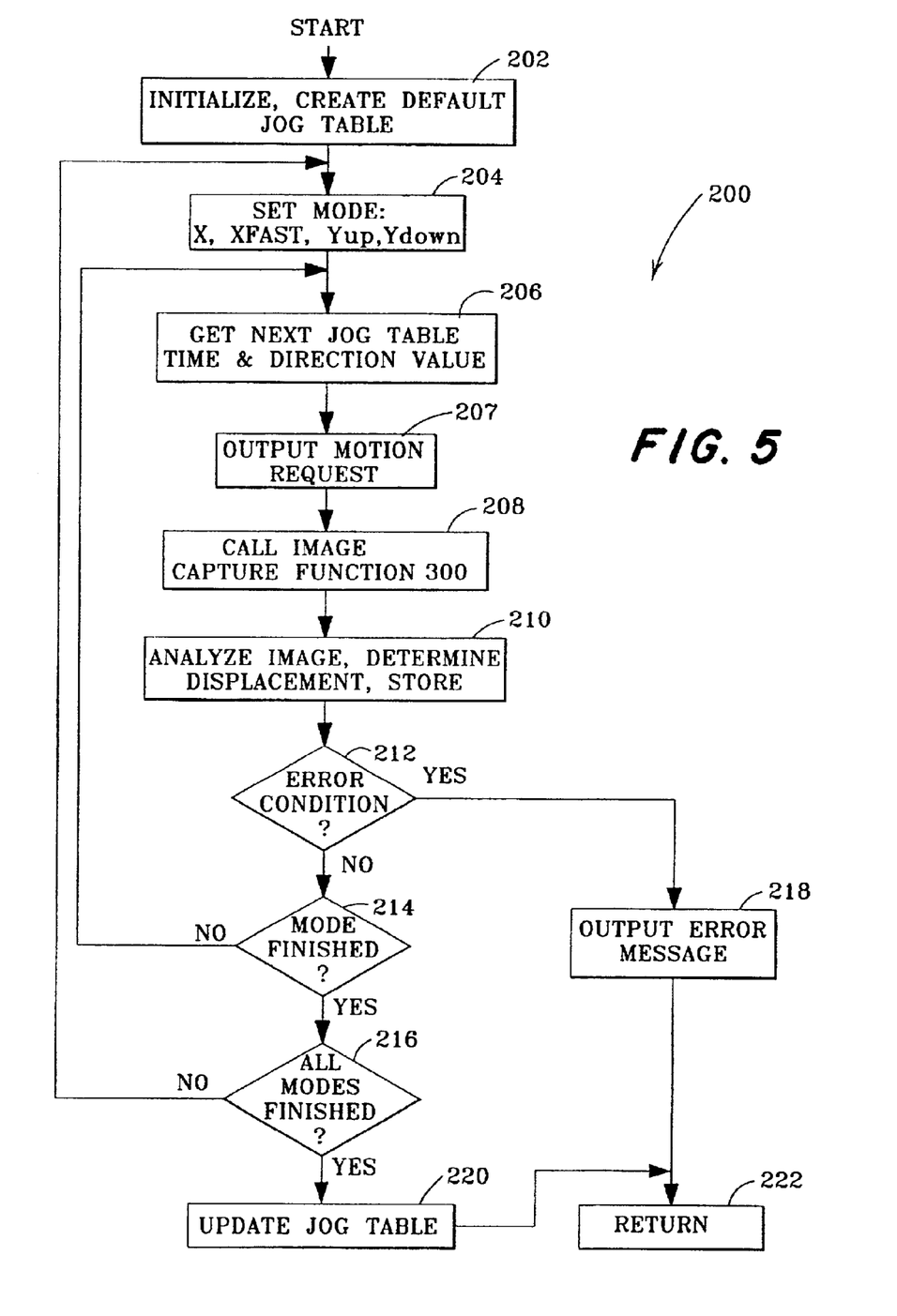
FIG. 5 is a logic flow diagram of a pre-operation calibration routine.

Step 112 calls a calibration subroutine 200 shown in more detail in FIG. 5. Step 114, in response to an autotrack command, directs the algorithm to step 115, which, if a ready flag is set to ready, directs the algorithm to step 116, else to step 104. Step 116 calls an autotracking loop or subroutine 400 shown in more detail in FIG. 8. Otherwise, the algorithm proceeds to step 118.

Figure 7:
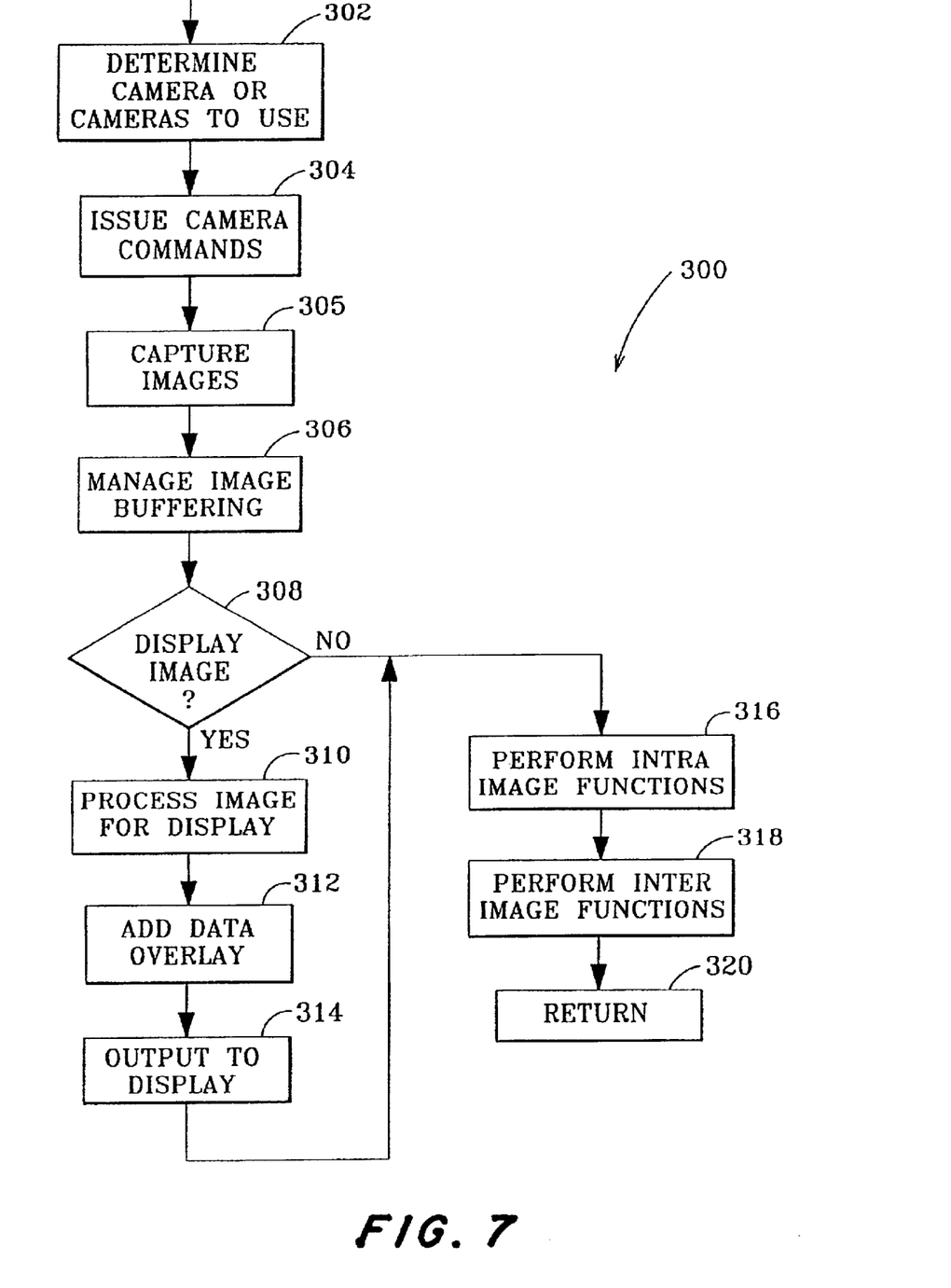
FIG. 7 is a logic flow diagram of an image capture routine.

Step 118 calls an image capture routine 300 shown in more detail in FIG. 7. If the raw captured image is usable, step 120 directs the algorithm to step 122, else to step 128. Step 122 performs various known image processing functions, such as low pass filtering, edge enhancement, thresholding, stripe detection, etc. Step 124 evaluates the processed image to determine if the image includes features which can be used for tracking the movement of the spout 12 relative to the vehicle 26. If in step 126, the processed image is not usable, step 128 generates a not usable message for display or communication to the operator, sets the ready flag to not ready and returns the algorithm to step 104. If the processed image is usable, step 126 directs the algorithm to step 130 which sets the ready flag to ready and returns the algorithm to step 104.

Referring now to FIG. 5, if the ready flag indicates that the image is usable, a pre-operation calibration routine 200 begins at step 202 which initializes or creates in temporary memory, preferably from factory programmed non-volatile memory (not shown), a stored default data table or "jog" table of asset of spout displacement values and a set of spout actuator energizing time values, each spout displacement value representing an amount of spout displacement which would result from energizing the actuator for the corresponding actuator energizing time value.

Figure 10:
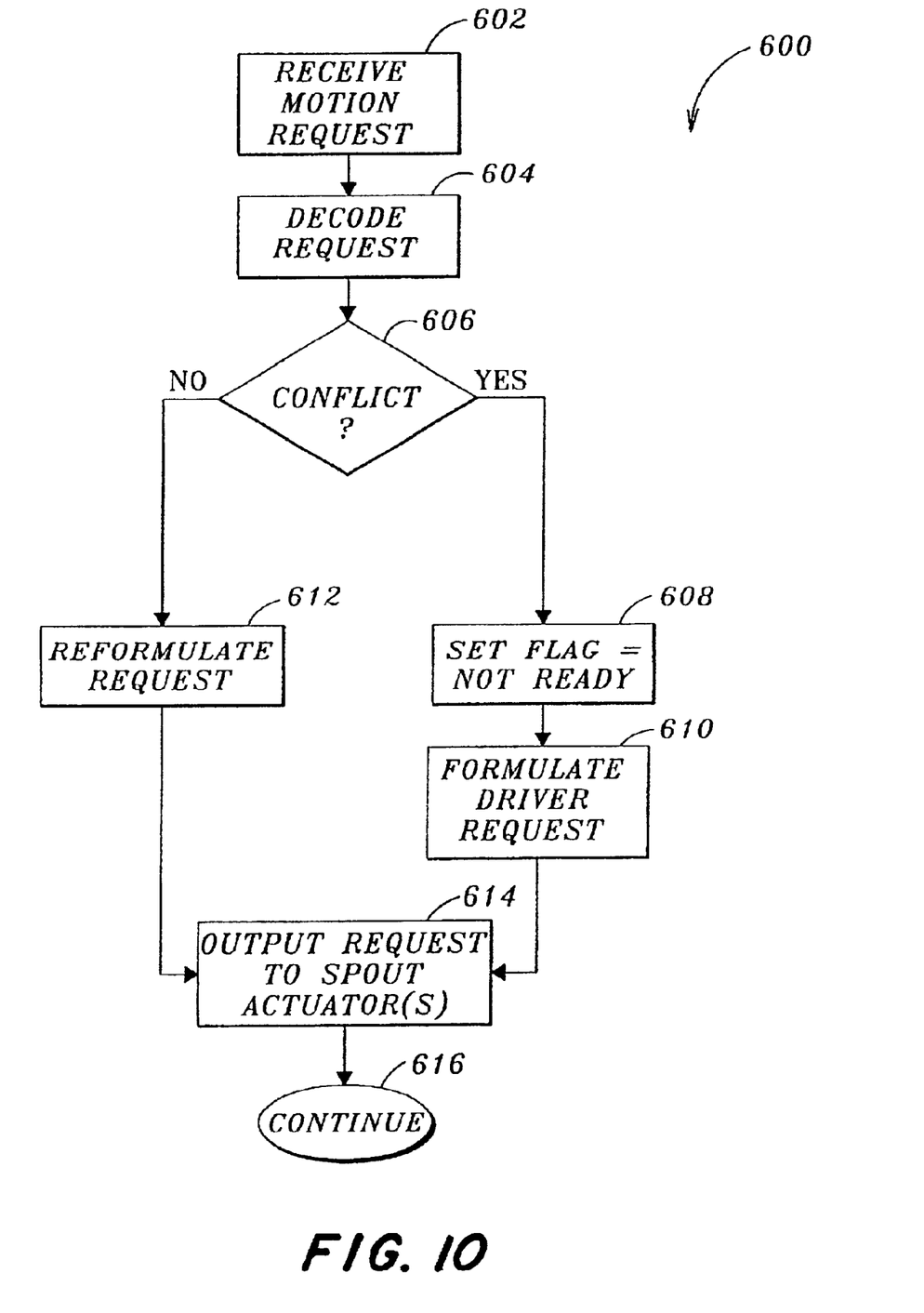
FIG. 10 is a logic flow diagram illustrating how the two controllers of FIG. 3 cooperate.

Step 204 sets the order of a plurality of spout/cap movement modes to X (spout rotating), X fast (fast spout rotating), Y up (spout cap pivoting upward) and Y down (spout cap pivoting downward), so that these different spout/cap movement modes are calibrated in a certain order, one after the other. These modes can be performed in any order, and the order in which theses modes are performed can be pre-set or can be varied by an operator, if desired. Step 206 obtains the next jog table time and direction value. Step 207 output a spout and cap motion request to the control module 21 which energizes the spout motor 14 and/or the cap motor 18 as shown in FIG. 10.

Step 208 calls the image capture routine 300 of FIG. 7. Step 210 analyzes the captured image, determines the actual spout or cap movement and stores the result.

Step 212 tests for various error conditions, including camera failure, insufficient light, failed communications or end of travel. If an error condition exists, then step 218 generates an operator error message and performs error handling functions, such as operation retry, system shutdown. If no error condition exists, then step 212 directs the algorithm to step 214 which will return the algorithm to step 206 if the algorithm is not finished with the current movement mode. If all movement modes are not finished, step 216 returns the algorithm to step 204 for calibration with respect to the next movement mode. If all modes are finished, step 220 updates the jog table as a result of repeated operation of step 210. After steps 218 or 220, the algorithm returns to the main algorithm.

Referring now to FIG. 7, the image capture routine 300 begins at step 302 which, if multiple cameras are in use, identifies which camera is active. Step 304 issues camera commands to the active camera to obtain an image or images, to adjust the exposure or to otherwise optimize the captured image. Step 305 captures and digitizes one or more images. Step 306 manages image buffering or storing, such as, for example, frame averaging of multiple images, or deleting images no longer needed.

If a display 50 is present, and the operator requests that an image be displayed, then step 308 directs the algorithm to step 310, else to step 316. Step 310 processes the image, such as optimizing contrast and brightness levels for display purposes. Step 312 add desired overlay data, such as pointers or text messages. Step 314 outputs to the display 50 the processed image resulting from steps 310–312.

Step 316 performs "intra" image processing functions, such as subsampling (using only some of the pixels in an image to speed up processing when maximum resolution is not needed), rotation, brightness and contrast adjustment. If a lower resolution image is acceptable, the system may capture only the odd or even image lines and then adjust for a proper vertical/horizontal ratio, or it may convert the image to gray scale.

Step 318 performs "inter" image processing functions (over multiple captured images), such as averaging to reduce effects of chaff. These functions are performed on an original image from steps 305 and 306, but not on images processed for display on monitor 50. Step 320 returns the algorithm to the main routine.

Figure 8:
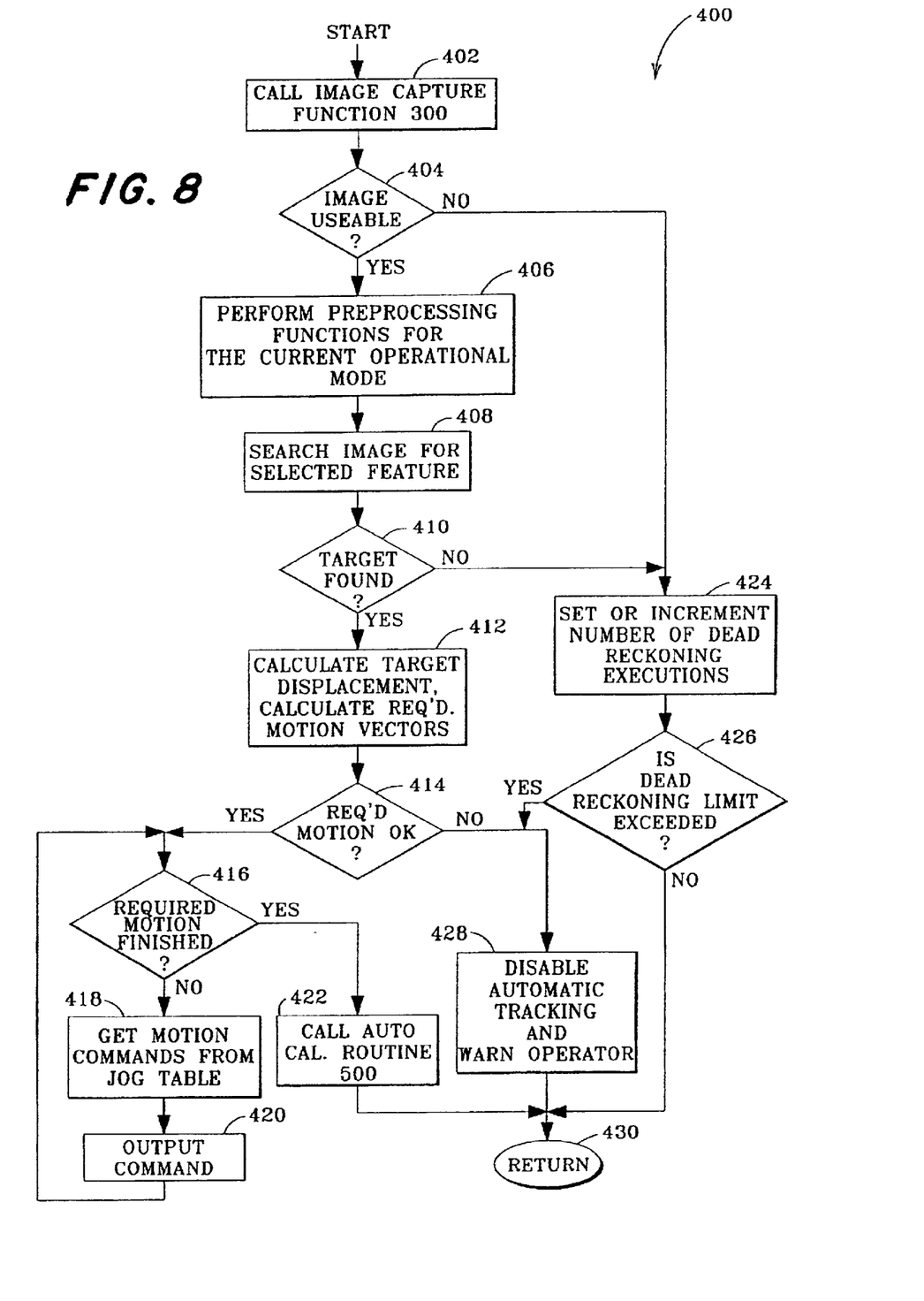
FIG. 8 is a logic flow diagram of an automatic tracking routine.

Referring now to FIG. 8, the automatic tracking routine 400 begins at step 402 which calls the image capture routine 300 of FIG. 7. If, in step 404, the captured image is not usable (the image status or "ready" flag=not ready), the algorithm proceeds to step 424, else to step 406. Step 406 performs known image preprocessing functions, such as low pass filtering, edge enhancement, thresholding, stripe detection, etc. Step 408 analyzes the captured image and searches the image for a previously selected trackable feature, such as the target 33. The search may involve various known image searching techniques, such as center weighted, last track or brute force techniques. If a target was not found, step 410 directs the algorithm to step 424, else to step 412.

Step 412 calculates the displacement of the target 33 from its previous position and determines the movements required to move the spout 12 to a desired position. Step 414 determines whether or not the required spout movements are within certain limits, such as whether the spout can be moved quickly enough or whether the spout 12 would be driven into engagement with mechanical travel stops (not show). If not, step 414 directs the algorithm to step 428, else to step 416.

Figure 6:
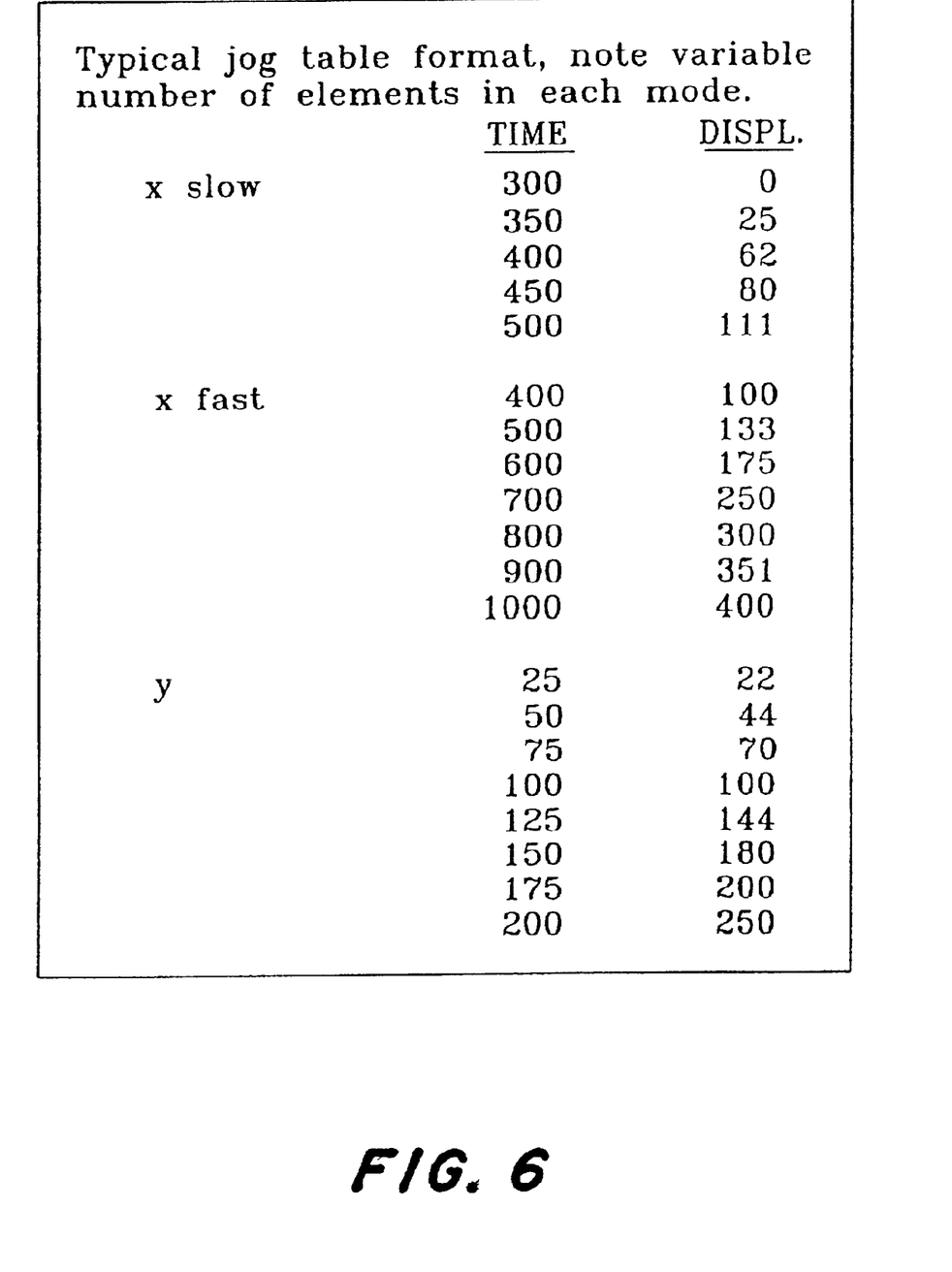
FIG. 6 is a table representing values used by the calibration routine.

If the required spout motion is not finished step 416 directs the algorithm to step 418. Step 418 uses a stored jog table, as exemplified by the table of FIG. 6, to obtain the motion commands which would produce the desired spout motion. Referring to FIG. 6, for each motion mode, there is stored a set of displacement values corresponding to a set of motor energization time values.

Referring again to FIG. 8, step 420 then outputs the motion command to the control module 21 which energizes the spout motor 14 and/or the cap motor 18 as shown in FIG. 10.

Figure 9:
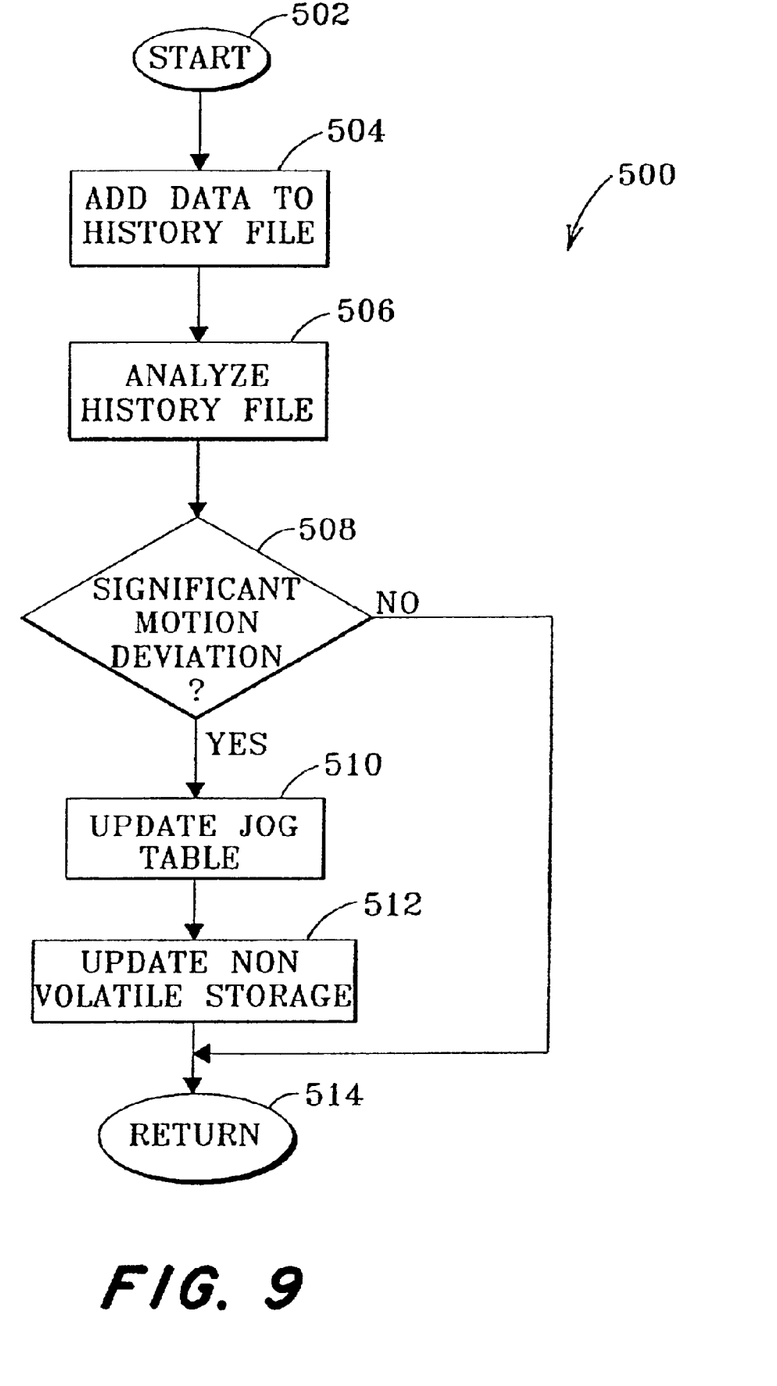
FIG. 9 is a logic flow diagram of an auto-calibration routine.

If, in step 416, the required spout motion is finished step 416 directs the algorithm to step 422 which calls an autocalibration routine 500 shown in FIG. 9. After step 422, routine 400 returns at step 430.

Step 424 increments a desired number of dead-reckoning passes, where a "dead reckoning pass" means an execution of the algorithm during which no spout or cap movement is commanded. Preferably, a limit number of dead-reckoning passes is stored upon startup of the system, and this limit number can be adjusted by an operator. If the limit number of dead reckoning passes is exceeded, step 426 directs the algorithm to step 428, else to step 430. Step 428 disables automatic spout control and sends a warning message to the operator. After step 428, routine 400 returns at step 430.

Thus, routine 400 processes the image from the camera 24 to determine if it contains an image of the previously selected trackable feature, such as target 33. If the image contains an image of the trackable feature, routine 400 determines whether or not the spout 12 (or cap 16) must be moved in response to movement of the trackable feature within the image. If so, a spout movement command is obtained from the stored jog table routine (step 418) and this spout movement command is sent to control unit 21 (step 420), which then moves the spout, or cap or both accordingly. When the spout or cap or both have finished moving in response to this motion command, step 422 calls the autocalibration routine 500 which determines whether or not the jog table should be updated as a result of this most recent movement of the spout and/or cap. In this manner the stored jog table is continually updated during operation of the system in order to adjust for changes which can occur over time.

Referring now to FIG. 9, the auto-calibration routine 500 begins at step 502. Step 504 adds the most recent motion command and spout/cap movement results data to a history file which is stored in the ECU 40. Step 506 analyzes the information in the history file, such as performing a trend analysis on the information. Step 508 determines whether or not the resulting spout or cap movement deviates significantly from the desired spout or cap movement. If not, step 508 directs the algorithm to step 514. If yes, step 508 directs the algorithm to step 510 which updates the jog table according to the results of the analysis performed in step 506. Step 512 updates the jog table stored in the non-volatile memory (not shown). Then, the routine 500 returns at 514.

Referring now to FIG. 10, the control module 21 executes an algorithm 600, and in step 602 receives a motion request from the ECU 40, as in steps 207 of FIG. 5 and step 420 of FIG. 8. Step 604 decodes the received motion request. If there is a conflict between the decoded motion request and a manual motion command via switches 20 or 22, then step 606 directs the algorithm to step 608. Step 608 sets the ready flag equal to not ready, step 610 formulates an operator motion command, and step 614 outputs this operator motion command to the spout and cap motors 14 and 18.

If there is no conflict between the decoded motion request and a manual motion command via switches 20 or 22, then step 606 directs the algorithm to step 612. Step 612 formulates an automatic motion command, and step 614 outputs this automatic motion command to the spout and cap motors 14 and 18. The algorithm returns or continues at step 616.

As a result, the system described herein obtains and processes an image of the trackable feature on the hauling vehicle 26, and in response, generates spout steering and cap pivoting control signals which are communicated to the electrohydraulic spout motor 14 and to cap motor 18 to pivot the spout 12 in response to a change in the position of the selected target elements, if there is a movement of those elements relative to the camera's field of view during the automatic tracking mode.

Preferably, when the control unit 40 is operating in its automatic tracking mode, control unit 21 causes control unit 40 to operate in a subservient fashion with respect to manual control of the spout 12 via the spout control switches 20, 22, and will drop out of its automatic tracking mode and revert to the automatic image capture mode and target selection mode whenever the operator exercises manual control over the spout 12. If desired, the control unit 40 could also automatically returns to the automatic tracking mode upon the release of the switches 20, 22 by the operator following any manual interruption of the automatic tracking mode. Thus, the operator may interrupt automatic control by using the switches 20, 22 (during which the auto target select function continues to operate). Also, if desired, upon release of the switches 20, 22, the control unit 40 reverts back to its auto track function and tracks the most recently selected "best target" in the last obtained image.

Thus, this spout control system is capable of operating in a stand-alone fashion such that there is no need for input from the driver of the hauling vehicle 26, and the driver of the hauling vehicle 26 need only maintain an approximate position relative to the harvester 10.

Optionally, the control unit 40 may be programmed to track multiple target elements in the field(s) of view of either or both cameras 24 and 25 in order to provide a control system which has an enhanced, image fault tolerance capacity, wherein the system can track one or more images concurrently and continue in its automatic tracking mode as long as at least one target image remains unobscured by dust, chaff or other environmental conditions.

The conversion of the above flow chart into a standard language for implementing the algorithm described by the flow chart in a digital computer or microprocessor, will be evident to one with ordinary skill in the art.

A portion of the disclosure of this patent document contains material which is subject to a claim of copyright protection. The copyright owner has no objection to the facsimile reproduction by anyone of the patent document or the patent disclosure, as it appears in the Patent and Trademark Office patent file or records, but otherwise reserves all other rights whatsoever.

While the present invention has been described in conjunction with a specific embodiment, it is understood that many alternatives, modifications and variations will be apparent to those skilled in the art in light of the foregoing description. For example, the invention can be applied to any system where a steerable spout is used to deliver material to relatively movable material receiving unit. Also, the invention can be applied to a crop delivery spout which delivers crop to a top loading crop hauling vehicle with the addition of edge tracking capability to use an edge of the hauling vehicle as the trackable feature. Accordingly, this invention is intended to embrace all such alternatives, modifications and variations which fall within the spirit and scope of the appended claims.

What is claimed is:

1. A spout control system for controlling and aiming a crop delivery spout of a material collecting vehicle with respect to a separate material hauling vehicle moving alongside the collecting vehicle, the control system comprising:

an image device for viewing a field of view including a portion of the hauling vehicle and generating an image signal;

a control unit receiving the image signal, processing the image signal and automatically generating a spout command signal as a function thereof; and an actuator which moves the spout automatically in response to the spout command signal.

2. The spout control system of claim 1, wherein:

the image device comprises a video camera mounted near an end of the spout.

3. The spout control system of claim 1, wherein:

a cap is pivotally mounted on an end of the spout, and the image device comprises a video camera mounted on the cap.

4. The spout control system of claim 1, wherein:

the control unit identifies a feature in the image, and generates the command signal to cause the actuator to maintain the spout oriented substantially in a certain direction relative to the feature.

5. The spout control system of claim 4, wherein:

the feature is a target placed on the hauling vehicle.

6. The spout control system of claim 1, wherein:

the control unit identifies a plurality of features in the image, and when a particular feature becomes obscured, generates the command signal to cause the actuator to maintain the spout oriented substantially in the direction relative to an unobscured one of the features.

7. The spout control system of claim 1, further comprising:

a manual control device for generating a manual spout control signal, the control unit receiving the manual spout control signal and preventing automatic control of the spout when a manual spout control signal is generated.

8. The spout control system of claim 7, wherein:

the spout control unit prevents automatic movement of the spout when the spout is controlled in response to an operator manipulation of the manual control device; and the spout control unit permits automatic movement of the spout when the manual control device is not manipulated for a certain time period.

9. The spout control system of claim 1, wherein:

a cap is pivotally mounted on an end of the spout; and a cap actuator pivots the cap relative to the spout in response to a cap command signal; and the control unit receiving the image signal and automatically generating the cap command signal as a function thereof.

10. The spout control system of claim 9, wherein:

the image device comprises a video camera mounted on the cap.

11. The spout control system of claim 1, wherein:

the control unit generates a data table including a set of spout displacement values, and a set of spout actuator energizing time values, each spout displacement value representing an amount of spout displacement which would result from energizing the actuator for the corresponding actuator energizing time value.

12. The spout control system of claim 11, wherein:

the control unit updates said data table after a plurality of command signals are applied to the actuator.

13. The spout control system of claim 11, wherein:

the control unit updates said data table only if an actual spout movement deviates significantly from a desired spout movement.

14. The spout control system of claim 11, wherein:

the control unit updates said data table after a command signal is applied to the actuator.

15. The spout control system of claim 11, wherein:

the control unit generates a data table representing a plurality of spout movement modes.

16. The spout control system of claim 15, wherein:

the spout movement modes comprise a normal spout rotating speed mode and a fast spout rotating speed mode.

17. The spout control system of claim 11, wherein: p1 a cap is pivotally mounted on an end of the spout, and a cap actuator pivots the cap relative to the spout in response to a cap command signal; and the control unit generates a data table representing a plurality of spout and cap movement modes so that the spout and cap movement modes are calibrated separately in a certain order, one after the other.

18. The spout control system of claim 16, wherein:

the movement modes comprise a normal spout rotating speed mode, a fast spout rotating speed mode, a cap pivoting upward mode and a cap pivoting downward mode.

19. The spout control system of claim 11, wherein:

the control unit includes a data table including a set of stored spout displacement values, and a set of stored spout actuator energizing time values, each spout displacement value representing an amount of spout displacement which would result from energizing the actuator for the corresponding actuator energizing time value, the control unit automatically generating a spout command signal as a function of sensed parameters and of one of the stored spout actuator energizing time values, the control unit updating the data table each time the actuator moves the spout in response to a command signal.

20. In a material collecting vehicle having a spout with a pivotal cap on an end thereof for directing material to a separate material hauling vehicle moving with the collecting vehicle, a control system for controlling the spout and the cap, the control system comprising:

an image device for viewing a field of view including a portion of the hauling vehicle and generating an image signal:

an image processing unit receiving the image signal and automatically generating a spout control signal and a cap control signal as a function thereof;

a spout motor which moves the spout automatically in response to the control signal; and a cap motor which moves the cap automatically in response to the cap control signal.

21. A spout control system for controlling and aiming a crop delivery spout of a material collecting vehicle with respect to a separate material hauling vehicle moving alongside the collecting vehicle, the control system comprising:

a control unit generating a spout command signal as a function of sensed parameters: and an actuator which moves the spout in response to the spout command signal, the control unit generating a data table including a set of spout displacement values, and a set of spout actuator energizing time values, each spout displacement value representing an amount of spout displacement which would result from operating the actuator for the corresponding actuator operating time value, the control unit generating a later spout command signal as a function of information stored in the data table.

22. The spout control system of claim 21, wherein:

the control unit generates a data table including a set of spout displacement values, and a set of spout actuator energizing time values, each spout displacement value representing an amount of spout displacement which would result from energizing the actuator for the corresponding actuator energizing time value.

23. The spout control system of claim 21, wherein:

the control unit updates said data table after a plurality of command signals are applied to the actuator.

24. The spout control system of claim 21, wherein:

the control unit updates said data table only if an actual spout movement deviates significantly from a desired spout movement.

25. The spout control system of claim 21, wherein:

the control unit updates said data table after a command signal is applied to the actuator.

26. The spout control system of claim 21, wherein:

the control unit generates a data table representing a plurality of spout movement modes.

27. The spout control system of claim 26, wherein:

the spout movement modes comprise a normal spout rotating speed mode and a fast spout rotating speed mode.

28. The spout control system of claim 21, wherein:

a cap is pivotally mounted on an end of the spout, and a cap actuator pivots the cap relative to the spout in response to a cap command signal: and the control unit generates a data table representing a plurality of spout and cap movement modes so that the spout and cap movement modes are calibrated separately in a certain order, one after the other.

29. The spout control system of claim 27, wherein:

the movement modes comprise a normal spout rotating speed mode, a fast spout rotating speed mode, a cap pivoting upward mode and a cap pivoting downward mode.

30. The spout control system of claim 21, wherein:

the control unit includes a data table including a set of stored spout displacement values, and a set of stored spout actuator energizing time values, each spout displacement value representing an amount of spout displacement which would result from energizing the actuator for the corresponding actuator energizing time value, the control unit automatically generating a spout command signal as a function of sensed parameters and of one of the stored spout actuator energizing time values, the control unit updating the data table each time the actuator moves the spout in response to a command signal.

31. A spout control system for controlling and aiming a crop delivery spout of a material collecting vehicle with respect to a separate material hauling vehicle moving alongside the collecting vehicle, the control system comprising:

a pair of image devices having overlapping fields of view including a portion of the hauling vehicle, each image device generating an image signal;

a control unit receiving the image signals, forming a combined image therefrom, processing the combined image and automatically generating a spout command signal as a function thereof; and an actuator which moves the spout automatically in response to the spout command signal.

* * * * *